(12) United States Patent
Ou Yang

(10) Patent No.: US 7,440,265 B2
(45) Date of Patent: Oct. 21, 2008

(54) VARIABLE-SIZED SCREEN

(75) Inventor: Liang Ou Yang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 388 days.

(21) Appl. No.: 11/317,051

(22) Filed: Dec. 27, 2005

(65) Prior Publication Data

US 2007/0146243 A1 Jun. 28, 2007

(51) Int. Cl.
*H05K 5/00* (2006.01)
*H05K 7/00* (2006.01)
*H04N 5/225* (2006.01)
*H04M 1/00* (2006.01)

(52) U.S. Cl. ............... 361/681; 361/683; 348/375; 455/575.4

(58) Field of Classification Search ........... 361/681, 361/683; 455/566, 575.3, 575.4; 348/375; 345/101, 30
See application file for complete search history.

(56) References Cited

U.S. PATENT DOCUMENTS

| 5,128,662 | A  | * | 7/1992  | Failla .................... 345/1.3 |
|-----------|----|---|---------|------------------------------------|
| 6,057,814 | A  | * | 5/2000  | Kalt ...................... 345/58 |
| 6,154,194 | A  | * | 11/2000 | Singh .................... 345/661 |
| 6,229,514 | B1 | * | 5/2001  | Larson ................... 345/101 |
| 6,317,108 | B1 | * | 11/2001 | Kalt ...................... 345/85 |
| 6,428,415 | B1 | * | 8/2002  | Ohba et al. .............. 463/31 |
| 6,498,597 | B1 | * | 12/2002 | Sawano ................... 345/107 |
| 6,691,441 | B1 | * | 2/2004  | Crivelli et al. ........... 40/471 |
| 6,771,232 | B2 | * | 8/2004  | Fujieda et al. ............ 345/30 |
| 6,771,237 | B1 | * | 8/2004  | Kalt ...................... 345/85 |
| 7,184,086 | B2 | * | 2/2007  | Tamura ................ 348/333.06 |
| 7,187,363 | B2 | * | 3/2007  | Nguyen et al. ............ 345/168 |
| 7,310,050 | B2 | * | 12/2007 | Yeh ..................... 340/815.83 |
| 2002/0090980 | A1 | * | 7/2002  | Wilcox et al. ........... 455/566 |
| 2003/0160892 | A1 | * | 8/2003  | Tamura ................... 348/375 |
| 2005/0040962 | A1 | * | 2/2005  | Funkhouser et al. ..... 340/815.4 |
| 2006/0194619 | A1 | * | 8/2006  | Wilcox et al. ........... 455/566 |
| 2006/0207142 | A1 | * | 9/2006  | Kochan et al. ............ 40/604 |
| 2007/0004475 | A1 | * | 1/2007  | Kuo et al. .............. 455/575.3 |
| 2007/0099333 | A1 | * | 5/2007  | Moriya .................... 438/96 |
| 2007/0195009 | A1 | * | 8/2007  | Yamamoto et al. .......... 345/1.1 |
| 2007/0247422 | A1 | * | 10/2007 | Vertegaal et al. .......... 345/156 |
| 2007/0285341 | A1 | * | 12/2007 | Manning .................. 345/1.3 |
| 2008/0012012 | A1 | * | 1/2008  | Hara ..................... 257/40 |

\* cited by examiner

*Primary Examiner*—Jayprakash N Gandhi
*Assistant Examiner*—Anthony M Haughton
(74) *Attorney, Agent, or Firm*—Rosenberg, Klein & Lee

(57) ABSTRACT

A variable-sized screen includes a support, at least one scrolling device and a flexible display. The support has a fixing frame and a movable frame, which are retractably connected. The scrolling device and the flexible display are assembled on the support. The flexible display is wrapped around the support, and the size of the flexible display is variable due to displacement of the support. When the support changes size through a retracted movement of the movable frame and the fixing frame, the flexible display also changes size correspondingly and the size of the screen becomes variable. Therefore, the dimensions of the screen and electronic products are not limited, and the display device has the advantages of a big screen yet is still portable and convenient for a user.

15 Claims, 11 Drawing Sheets

VARIABLE-SIZED SCREEN

BACKGROUND OF THE INVENTION

1. Field of the Invention

The present invention relates to a variable-sized screen, and particularly relates to a variable-sized screen adapted for a portable electronic device, so that the portable electronic device has adjustable dimensions and therefore the advantages offered by a large screen while still being portable and convenient for a user.

2. Description of the Related Art

As modern digital technology has progressed, portable electronic devices such as notebooks, personal digital assistances and mobile phones have become more common. Portable electronic devices are conventionally equipped with a liquid crystal display for displaying images. A basic requirement for displaying large images is a portable electronic device with large dimensions. Such a device is, of course, not easy to carry about. On the other hand, portable electronic devices need to be lightweight. However, because of this weight restriction, such devices necessitate a small screen that is conventionally only capable of displaying unclear images.

With respect to FIG. 1, a conventional mobile phone 9 includes a base 91, a liquid crystal display 92 arranged on the base 91, a lifting lid 93 relative to the base 91, a window 94 corresponding to the display 92 to reveal a small image on the display 92. The size of the liquid crystal display 92 is fixed, and the conventional mobile phone 9 cannot vary the dimensions thereof.

SUMMARY OF THE INVENTION

A variable-sized screen according to the present invention is provided. The electronic device can vary the dimensions thereof flexibly without restriction because of the variable-sized screen. Therefore, the screen has the advantages of having a large screen while also being lightweight and portable.

A variable-sized screen according to the present invention includes a support, at least one scrolling device and a flexible display. The support has a fixing frame and a movable frame, which are connected retractably. The scrolling device and the flexible display are assembled on the support. The flexible display is wrapped around the support, and the size of the flexible display is variable due to the displacement of the support.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
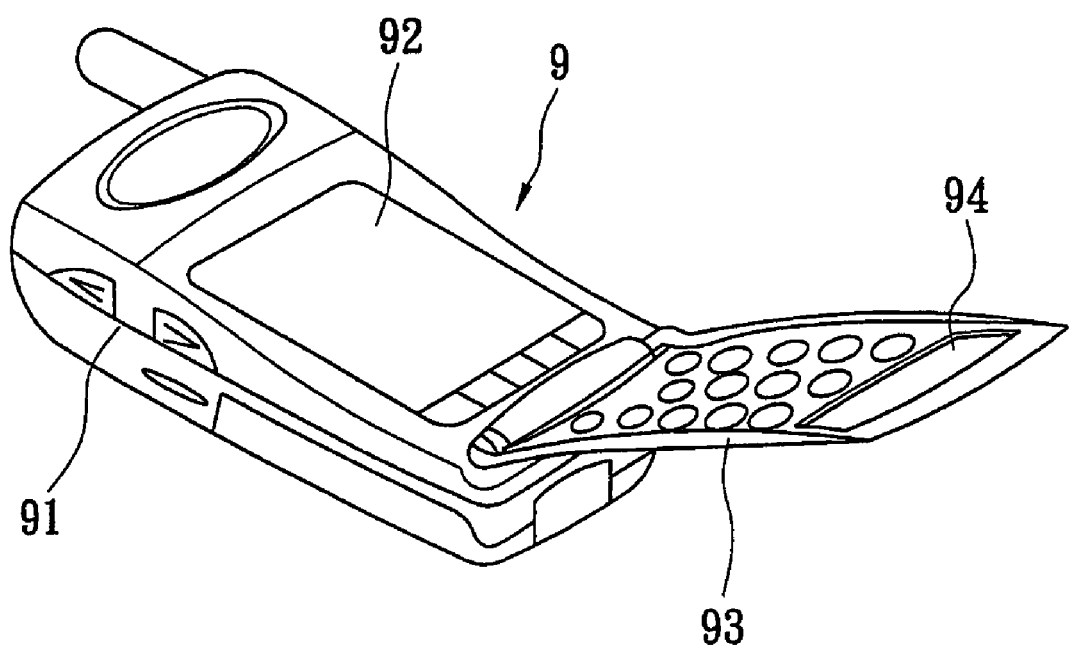
FIG. 1 is a perspective view of a conventional mobile phone.
Figure 2:
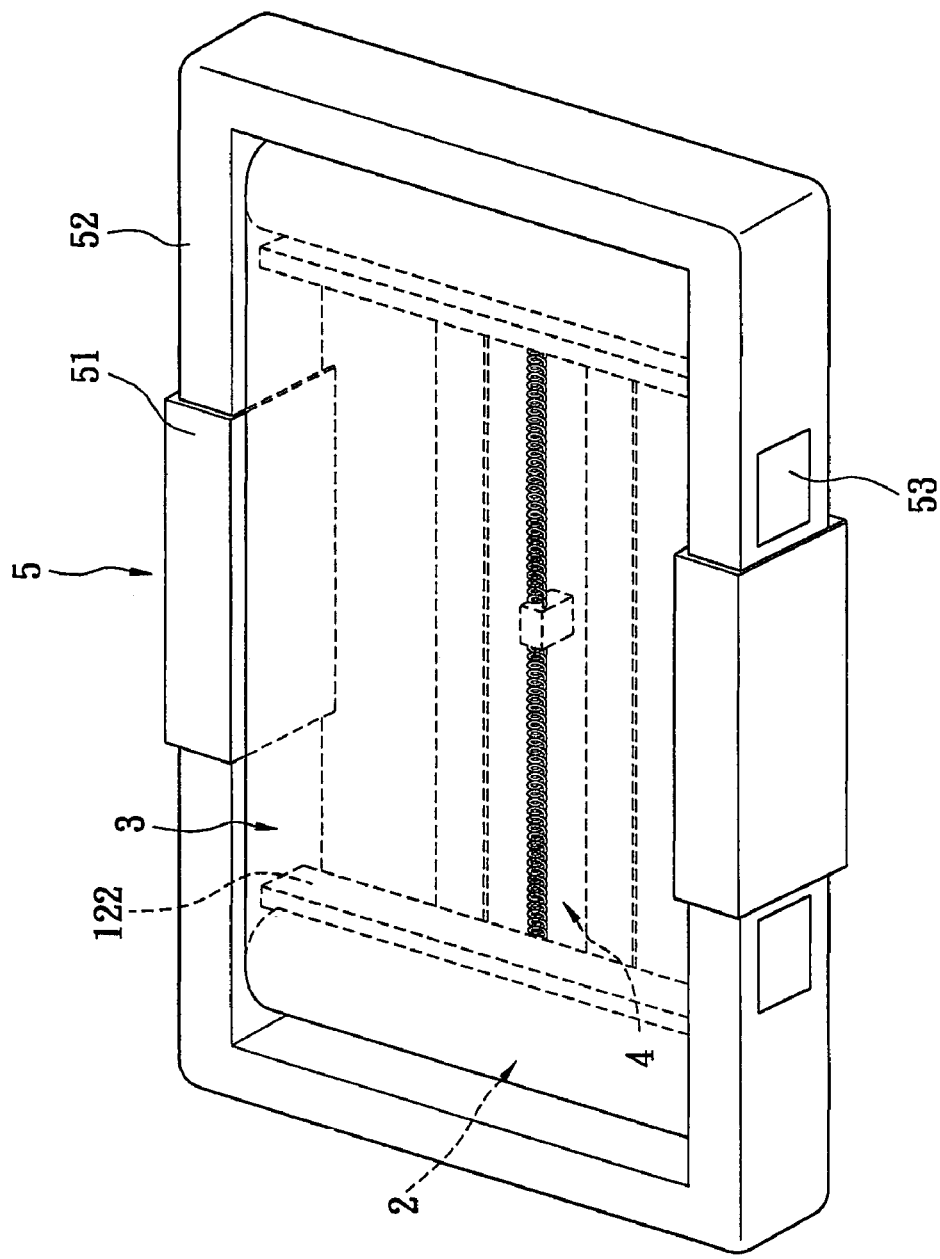
FIG. 2 is a perspective view of a first embodiment of a variable-sized screen according to the present invention.
Figure 3:
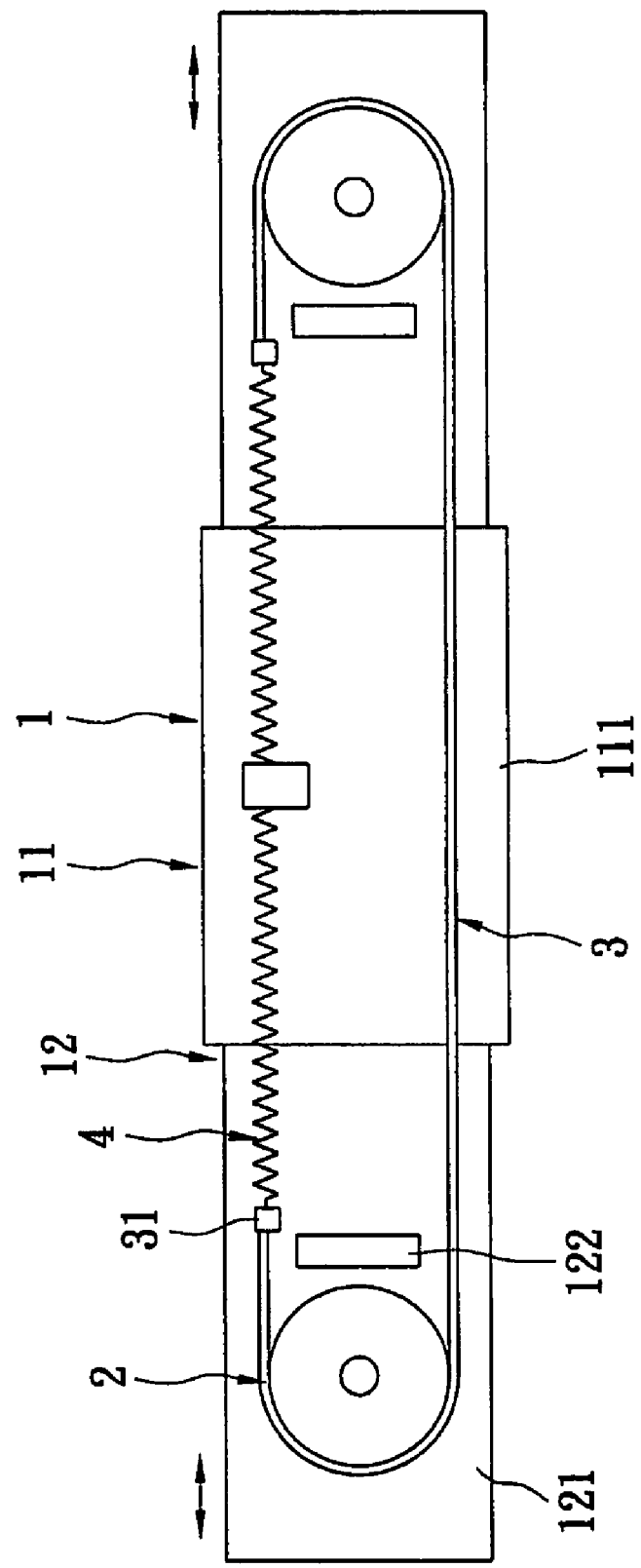
FIG. 3 is a cross-sectional profile with a top view of the first embodiment of the variable-sized screen according to the present invention.
Figure 4:
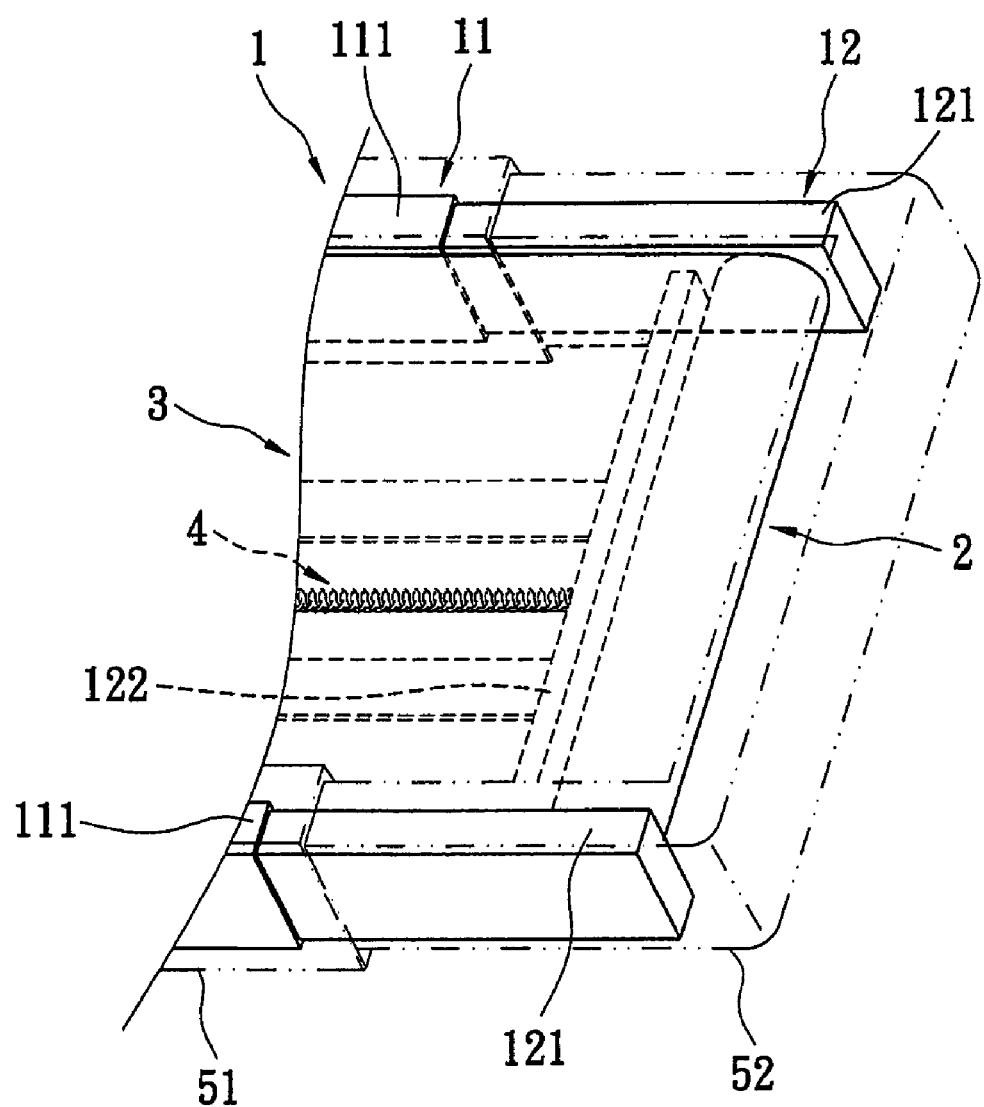
FIG. 4 is an enlarged perspective view of the first embodiment of the variable-sized screen according to the present invention.
Figure 5:
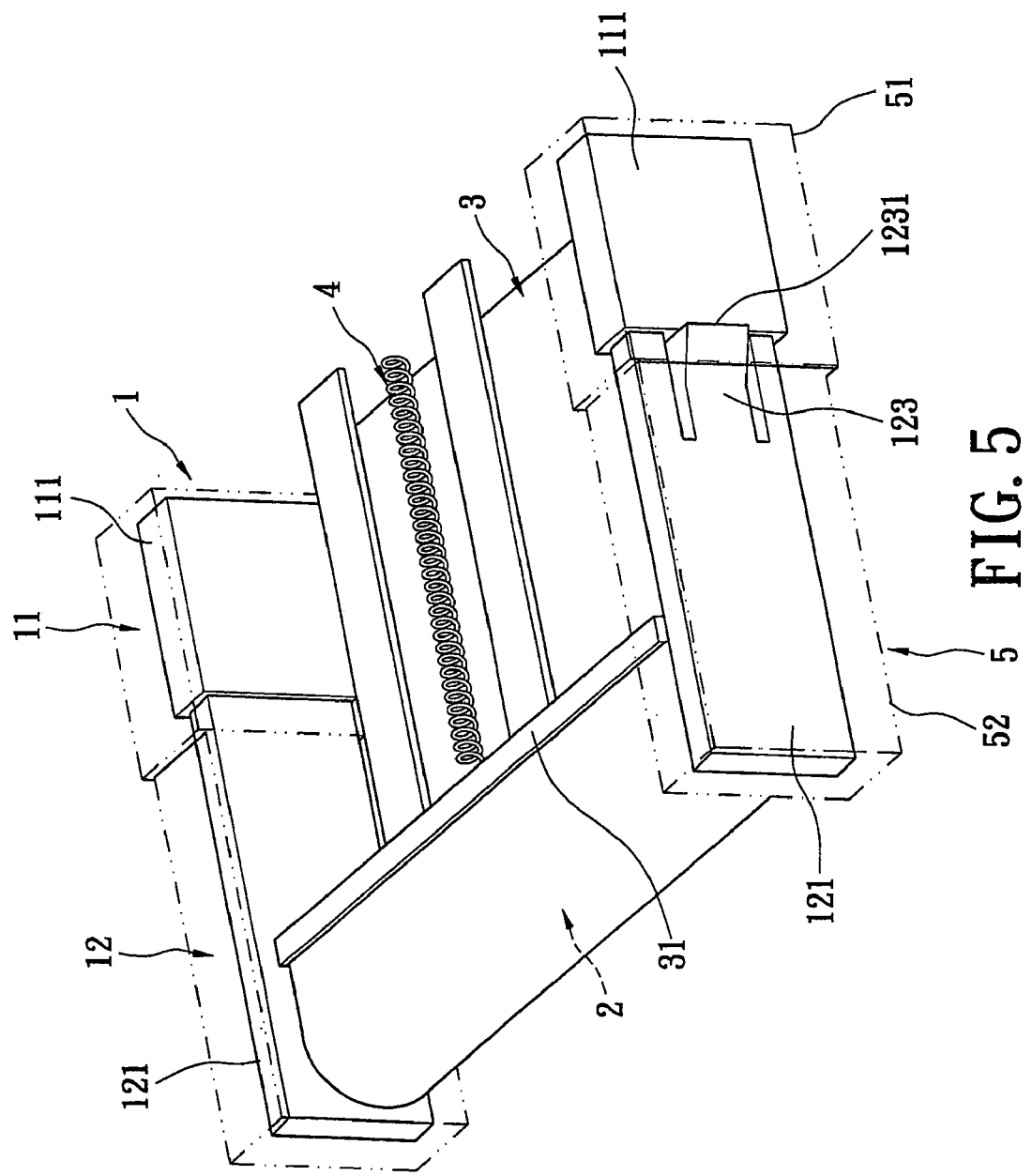
FIG. 5 is an enlarged perspective view from another angle of the first embodiment of the variable-sized screen according to the present invention.

A variable-sized screen according to the present invention is provided. The size of the screen can be adjusted either manually or driven by a motor or a liquid cylinder. Referring to FIGS. 2 to 5, a manually adjustable screen is disclosed. The screen includes a support 1, at least one scrolling device 2 and a flexible display 3. The frame 1 includes a fixing frame 11 and at least one movable frame 12. The fixing frame 11 is secured at a predetermined position to an electronic device. The fixing frame 1 includes a pair of first racks 111, which are opposite to each other in an upper-and-lower relationship. The first racks 111 are hollow for receiving the movable racks 12.

In this embodiment, there are two movable frames 12 assembled to two lateral sides of the fixing frame 11 so that both sides of the screen can retract. If one movable frame 12 is provided, only one side of the screen retracts. Each movable frame 12 has a pair of second racks 121 and a connection lever 122 assembled between the second racks 121. The second racks 121 are opposite to each other in an upper-and-lower relationship and are received in the first racks 111 individually so that the movable frame 12 can connect to the fixing frame 1 retractably. The movable frame 12 is a manually adjustable device, so a user can adjust the movable frame 12 to change the size of the support 1.

One of the second racks 121 of the movable frame 12 includes a resilient tenon 123 disposed on an exterior surface thereof and opposite to free end thereof. The resilient tenon 123 and has an orientation surface 1231 formed at an end thereof. If the movable frame 12 is received in the fixing frame 11, the resilient tenon 123 can be pressed thereby unlocking the exterior surface of the second rack 121. When the movable frame 12 reaches a predetermined position, the resilient tenon 123 rebounds outwardly. Therefore, the orientation surface 1231 of the resilient tenon 123 is retained against an end of the first rack 111 of the fixing frame 11 for connecting the movable frame 12 firmly while the movable frame 12 opens and expands.

In this embodiment, there are two scrolling devices 2 assembled inside the support 1. Each of the two scrolling devices 2 is cylindrical, and disposed between the second racks 121 but adjacent to a border thereof. Each scrolling device 2 has two ends connected to interior surfaces of the second racks 121 of the movable frame 12. Thus, the two scrolling devices 2 are used to stretch and retract the flexible display 3.

The flexible display 3 is a resilient and foldable display. The flexible display 3 can be an organic light-emitting display, which includes a plurality of organic light-emitting diodes (OLEDs), or the flexible display 3 is an electronic paper. The flexible display 3 electrically connects with a circuit unit (not shown). In this embodiment, the flexible display 3 is an organic light-emitting display. Because the organic light-emitting display is luminescent, it uses less power than a LCD (Liquid Crystal Display), and has a wide-viewing angle, a response time of microseconds, and a high level of luminescent efficiency. No crystal material is used in the organic light-emitting display so it is easy to manufacture. The material of the organic light-emitting display further includes plastics or metallic foil so that the flexible display 3 can be rolled up.

The flexible display 3 is assembled inside the support 1, meaning that the flexible display 3 is assembled between the first racks 111 of the fixing frame 11 and the second racks 121 of the moving frame 12. The flexible display 3 is disposed in front of the two rolling devices 2, and two ends of the flexible display 3 are further wrapped around the two scrolling devices. Therefore, the flexible display 3 is spread out and its size can be adjusted by displacing the moving frame 12 of the support 1. Two ends of the flexible display 3 connect to two end levers 31 respectively, and each of the end levers 31 connects to an end of a resilient member 4. The resilient member 4 has another end connected to an appropriate position of the fixing frame 11, and provides the flexible display 3 with a retractable force in order to shrink the moving frame 12 into the fixing frame 11. Thus, the flexible display 3 can be retracted to a smaller size.

Furthermore, a casing 5 is included and has a contour corresponding to a shape of an electronic device. The casing 5 has a fixing cover 51 and a movable cover 52 to which the fixing frame 11 and the movable frame 12 of the support 1 respectively correspond. The size of the fixing cover 51 and the movable cover 52 vary relative to the support 1 in a simultaneous manner. The movable cover 52 of the casing 5 has a button 53 corresponding to the resilient tenon 123 of the movable frame 12, so that the button 53 can be pressed to push the resilient tenon 123 for varying the size of the flexible display 3.

Figure 6:
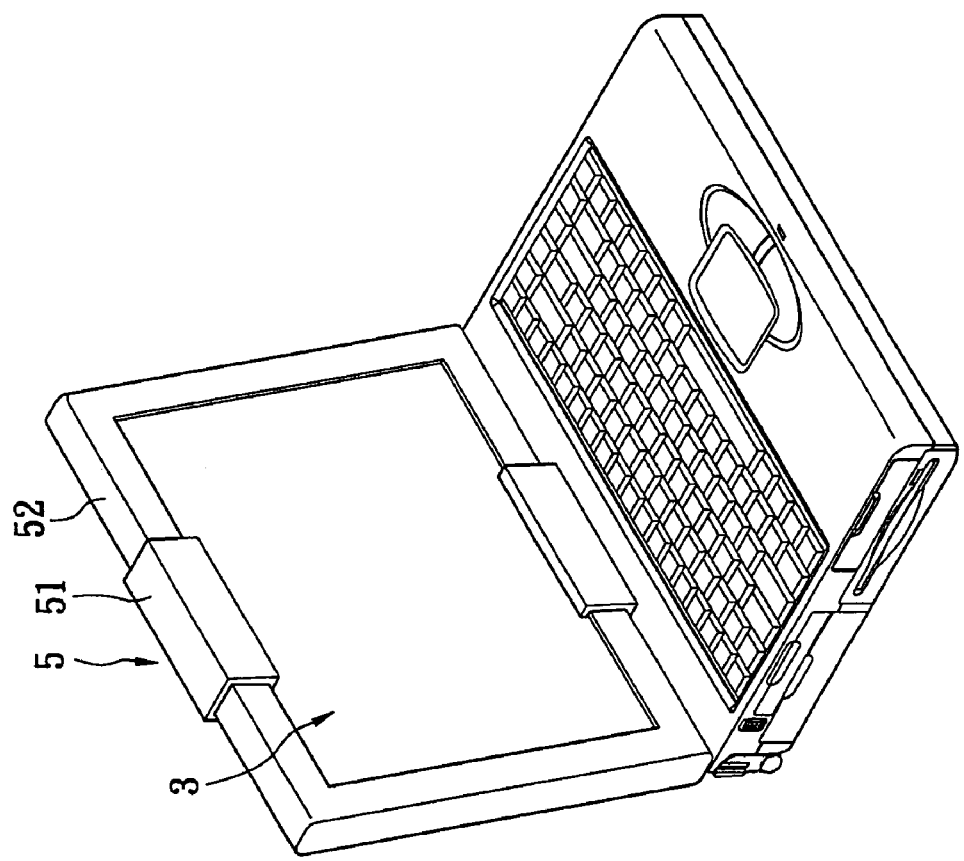
FIG. 6 is a perspective view of the first embodiment of the variable-sized screen applied to a notebook according to the present invention.
Figure 7:
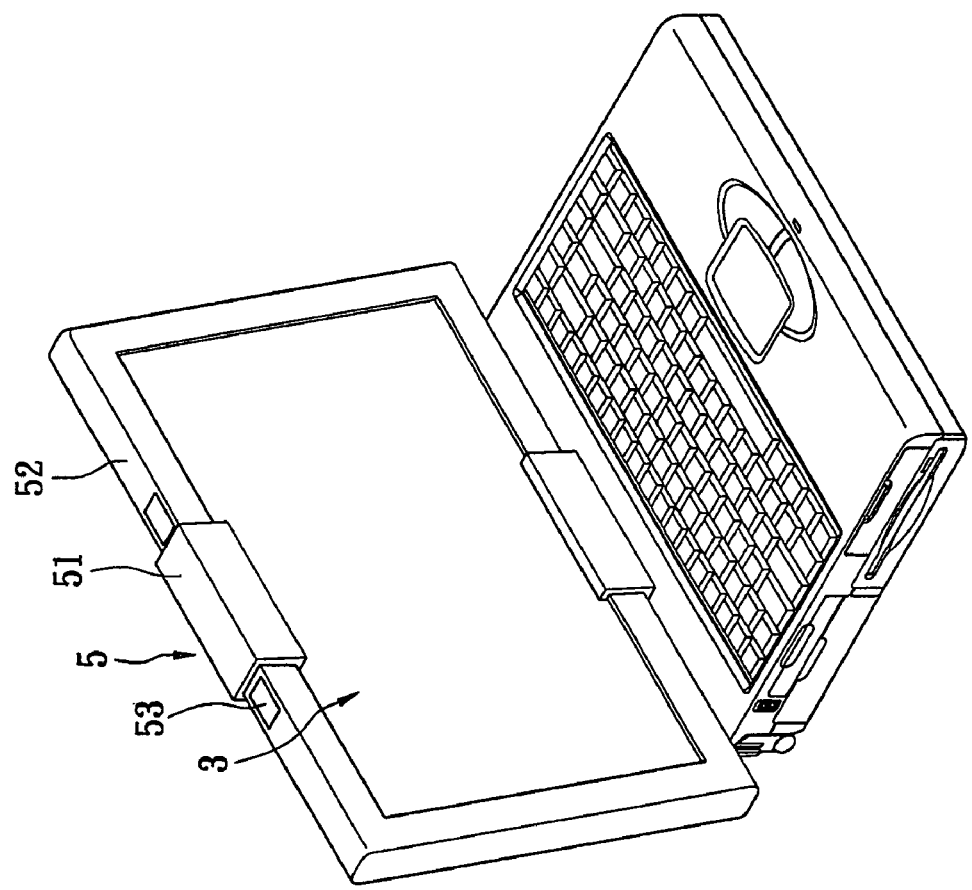
FIG. 7 is a perspective view of the first embodiment of the variable-sized screen applied to a notebook according to the present invention, when the screen is adjusted to a large size.

Referring to FIGS. 6 and 7, the variable-sized screen according to the present invention can be applied to a notebook. Alternatively, the variable-sized screen according to the present invention can be adapted to a foldable keyboard for reducing the total size thereof. Beside the application of the notebook, the variable-sized screen according to the present invention can be further applied to a portable electronic device, such as a PDA or a mobile phone, or provided in places of limited space such as a car or the back of a chair.

Figure 8:
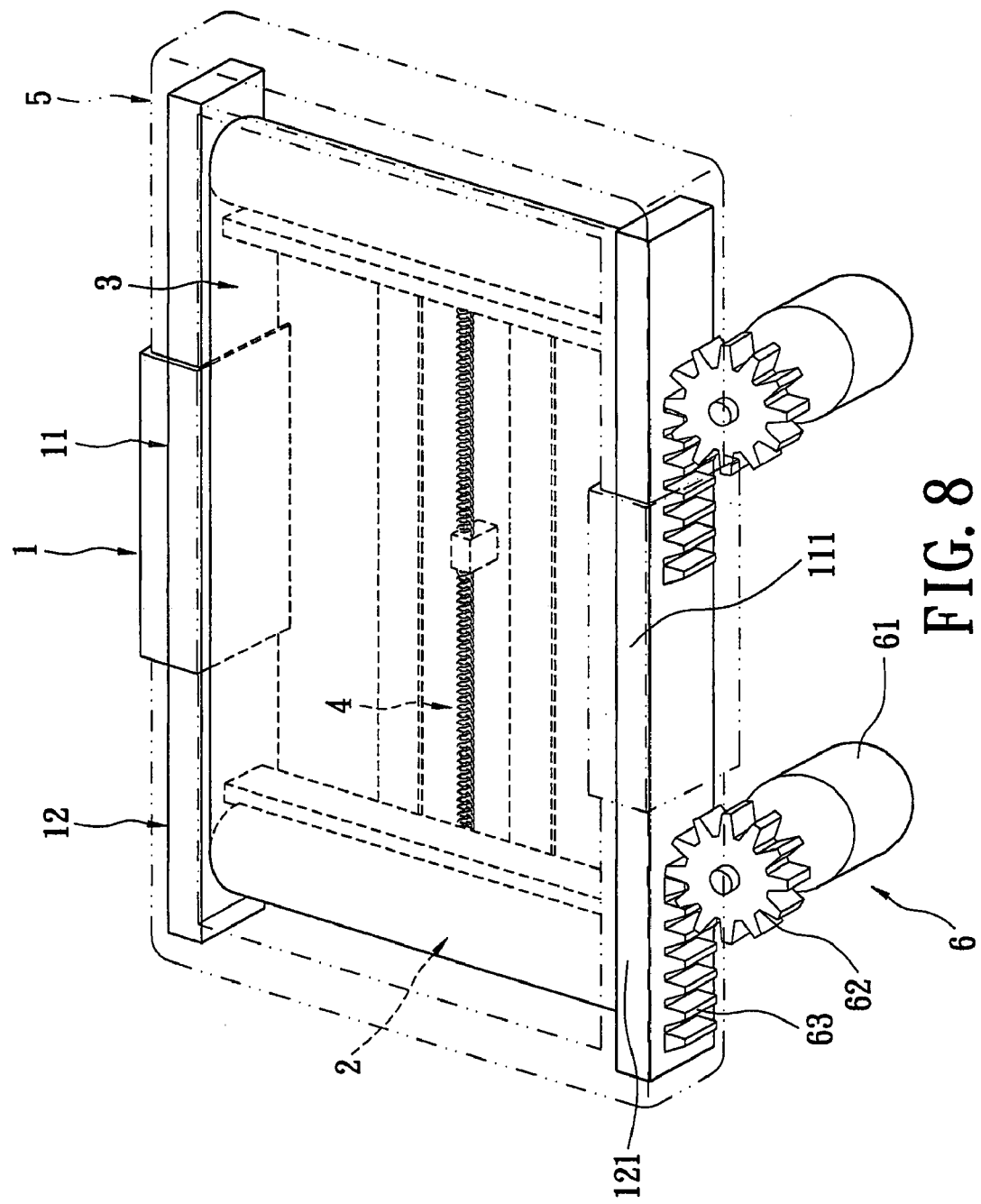
FIG. 8 is a perspective view of a second embodiment of the sized-variable screen according to the present invention.
Figure 9:
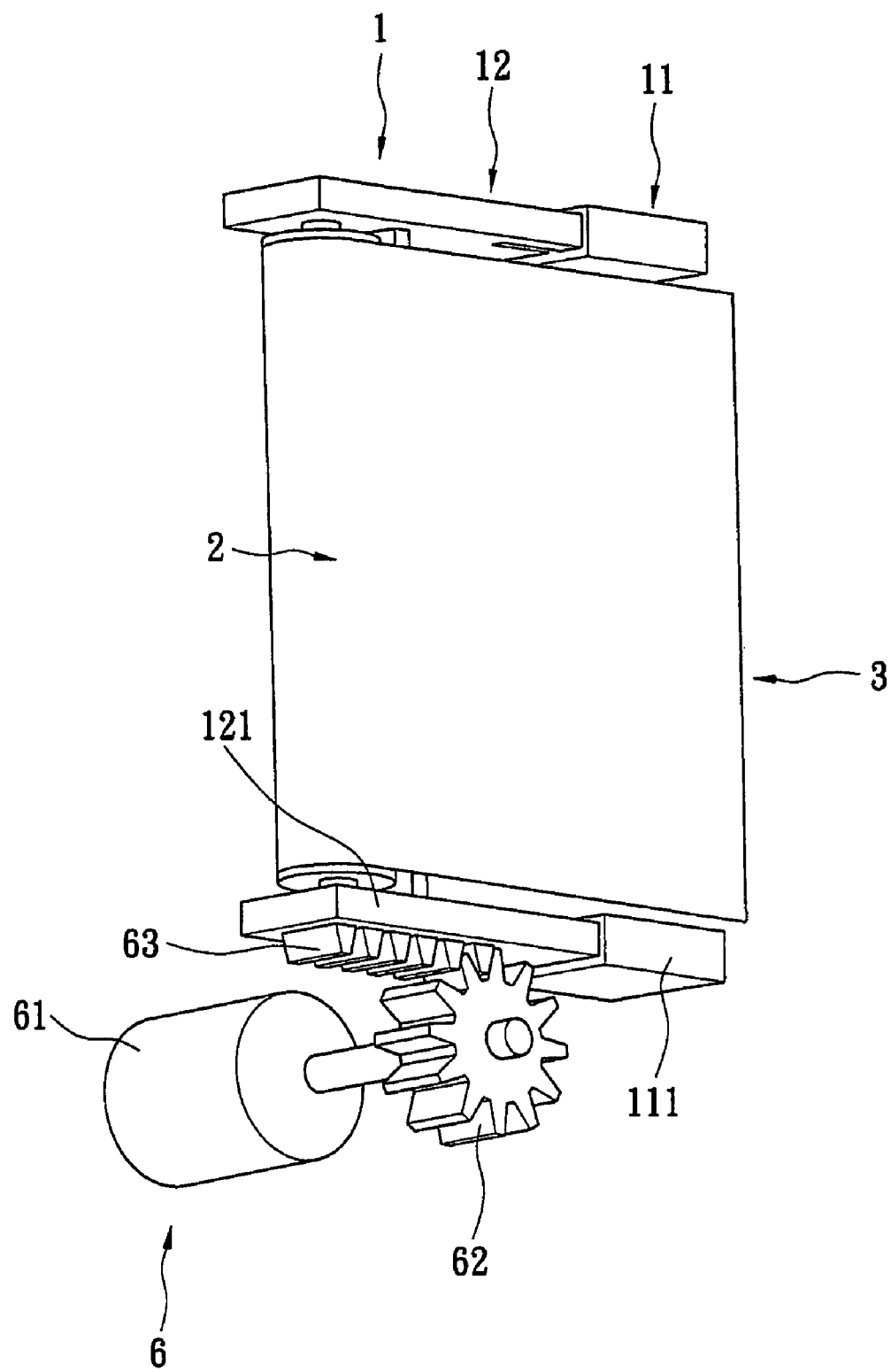
FIG. 9 is an enlarged perspective view of the second embodiment of the sized-variable screen according to the present invention.

With respect to FIGS. 8 and 9, the variable-sized screen according to the present invention further includes at least one driving device 6 assembled to the support 1. The driving device 6 includes a motor 61, a spur gear 62 connected with the motor 61, and a gear rack 63 assembled to the second rack 121 of the movable frame 12 and meshed with the spur gear 62. The driving device 6 drives the spur gear 62 to rotate, and the spur gear 62 drives the gear rack 63 to carry the movable frame 12 for moving retractably inside the fixing frame 11. In this embodiment, the variable-sized screen with the driving motor 6 occupies its maximum possible amount of space.

Figure 10:
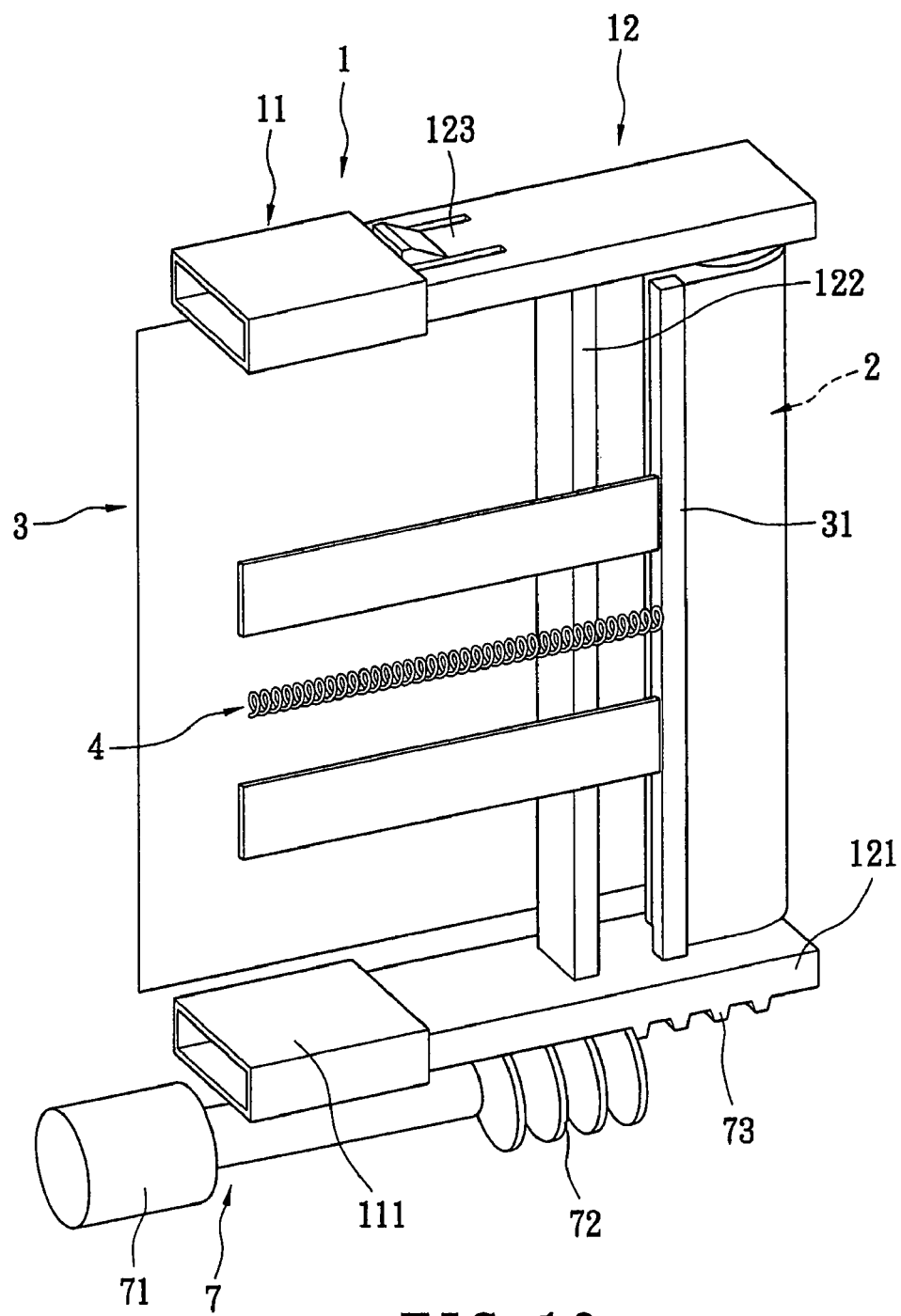
FIG. 10 is an enlarged perspective view of a third embodiment of the sized-variable screen according to the present invention.

Referring in FIG. 10, another driving method for the variable-sized screen includes at least one driving device 7 assembled inside the support 1. The driving device 7 includes a motor 71, a worm gear 72 connected with an axle of the motor 71, and a worm shaft 73 assembled to the movable frame 12 and meshed with the worm gear 72. The driving device 7 drives the worm gear 72 to rotate, and the worm gear 72 drives the worm shaft 73 to carry the movable frame 12 for moving retractably inside the fixing frame 11. In this embodiment, the variable-sized screen with the driving motor 7 occupies its least possible amount of space.

Figure 11:
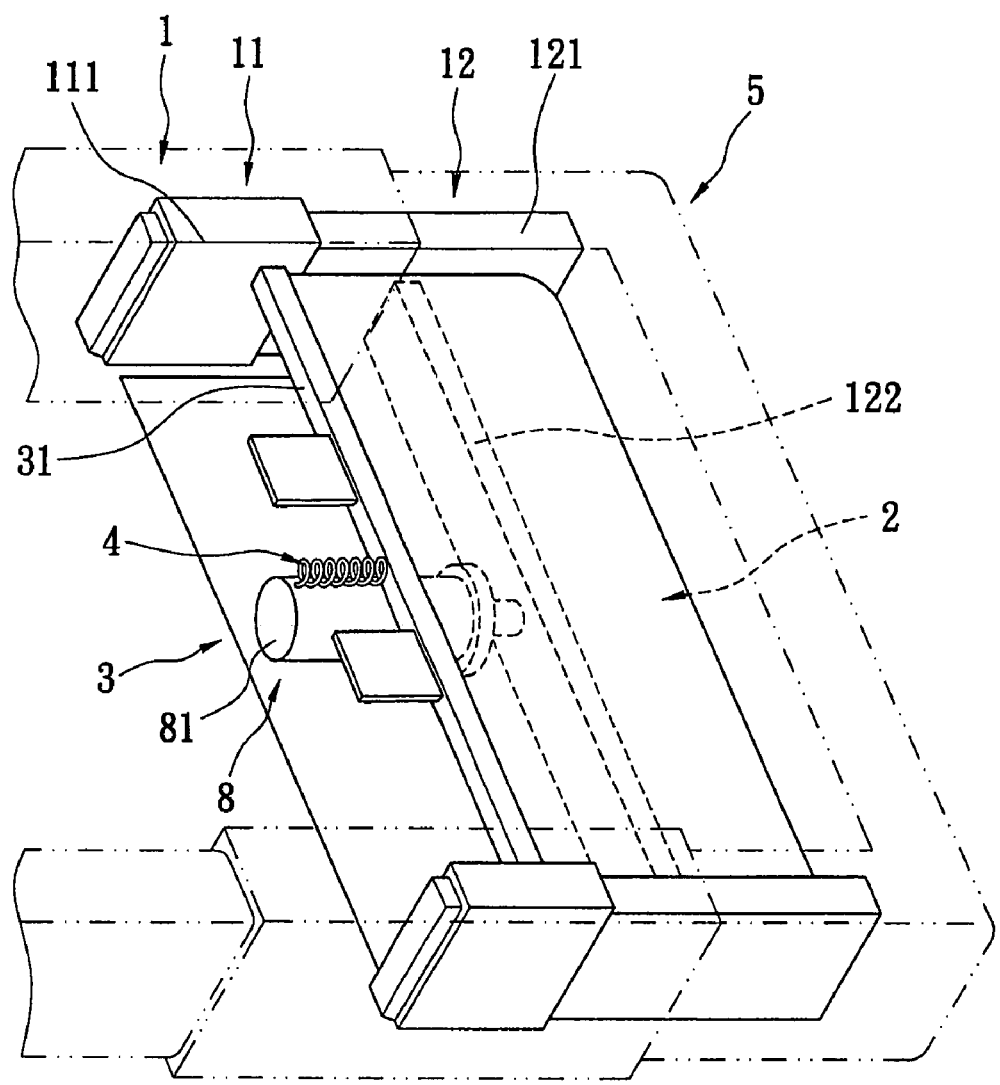
FIG. 11 is an enlarged perspective view of a fourth embodiment of the sized-variable screen according to the present invention.

Referring in FIG. 11, an additional driving method for the variable-sized screen includes at least one driving device 8 including a hydraulic cylinder 81 connected to the movable frame 12. The hydraulic cylinder 81 has a piston rod connected to a middle of the connection lever 122 of the movable frame 12. The hydraulic cylinder 81 is a driving element that drives the connection lever 122 to carry the movable frame 12 inside the fixing frame 11.

The movable frame 12 is moved relative to the fixing frame 11 for varying the size of the support 1. The movable frame 12 drives the flexible display 3 to change the visible size of the flexible display. Thus, the electronic device can vary the dimensions of the flexible display 3 without restriction because of the variable-sized screen. The flexible display therefore has the advantages offered by a large screen as well as the convenience of a small portable electronic device.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A variable-sized screen, comprising:
   a support having a fixing frame and at least one movable frame connected to the fixing frame, the at least one movable frame being selectively reversibly retractable into or pulled from the fixing frame, the movable frame including a movable resilient tenon having an orientation surface on one side thereof, the movable resilient tenon being upwardly sprung out from a surface of the movable frame and the orientation surface abutting against an end of the fixing frame when the movable frame is pulled out from the fixing frame;
   at least one scrolling device arranged inside the support; and
   a flexible display assembled in the support and wrapped around the scrolling device, so a size of the flexible display can be altered due to displacement of the movable frame of the support.

2. The variable-sized screen as claimed in claim 1, wherein the fixing frame of the support has a pair of first racks, which are opposite to each other and are hollow; the movable frame of the support has a pair of second racks, which are opposite to each other and are retractably received inside the first racks individually.

3. The variable-sized screen as claimed in claim 1, wherein the number of the movable frame is two, and these two movable frames are assembled to two lateral sides of the fixing frame.

4. The variable-sized screen as claimed in claim 1, further including a casing, wherein the casing has a fixing cover and a movable cover corresponding to the fixing frame and the movable frame of the support respectively.

5. The variable-sized screen as claimed in claim 1, wherein the scrolling device is connected to the movable frame of the support.

6. The variable-sized screen as claimed in claim 1, wherein the flexible display is an organic light-emitting display, which includes a plurality of organic light-emitting diodes (OLEDs).

7. The variable-sized screen as claimed in claim 1, wherein the flexible display is an electronic paper.

8. The variable-sized screen as claimed in claim 1, wherein the flexible display is disposed in front of the scrolling device, the flexible display has an end wrapped around the scrolling device and connected to an end lever; the end lever is connected to an end of a resilient member, and the resilient member has another end connected to the fixing frame.

9. The variable-sized screen as claimed in claim 1, wherein the movable frame is a manually adjustable device.

10. The variable-sized screen as claimed in claim 1, further including a driving device assembled to the movable frame.

11. The variable-sized screen as claimed in claim 10, wherein the driving device includes a motor, a spur gear connected with the motor, and a gear rack assembled to the movable frame and engaged with the spur gear.

12. The variable-sized screen as claimed in claim 10, wherein the driving device includes a motor, a worm gear connected with the motor, and a worm shaft assembled to the movable frame and engaged with the worm gear.

13. The variable-sized screen as claimed in claim 10, wherein the driving device includes a hydraulic cylinder connected to the movable frame.

14. The variable-sized screen as claimed in claim 1, further comprising a casing with a movable cover, wherein the movable cover has a button corresponding to the movable resilient tenon, so that the button is pressed to push the movable resilient tenon for varying the size of the flexible display.

15. A variable-sized screen, comprising:
- a support having a fixing frame and at least one movable frame connected retractably to the fixing frame;
- at least one scrolling device arranged inside the support; and
- a flexible display assembled in the support and wrapped around the scrolling device, so a size of the flexible display can be altered due to displacement of the movable frame of the support, wherein the flexible display is disposed in front of the scrolling device, the flexible display has an end wrapped around the scrolling device and connected to an end lever, the end lever is connected to an end of a resilient member, and the resilient member has another end connected to the fixing frame.

* * * * *